(12) United States Patent
Liu et al.

(10) Patent No.: US 9,884,283 B2
(45) Date of Patent: Feb. 6, 2018

(54) METHOD FOR TREATING SULPHUR-CONTAINING EXHAUST GASES AND DEVICE THEREOF

(71) Applicant: China Petroleum & Chemical Corporation, Beijing (CN)

(72) Inventors: Aihua Liu, Shandong (CN); Jianfeng Shang, Shandong (CN); Baojun Luo, Shandong (CN); Jianli Liu, Shandong (CN); Jinshan Xu, Shandong (CN); Wenliang Zhang, Shandong (CN); Peng Han, Shandong (CN); Cuicui Xu, Shandong (CN); Weidong Tao, Shandong (CN)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 140 days.

(21) Appl. No.: 14/731,996

(22) Filed: Jun. 5, 2015

(65) Prior Publication Data

US 2015/0352482 A1 Dec. 10, 2015

(30) Foreign Application Priority Data

Jun. 6, 2014 (CN) .......................... 2014 1 0248100

(51) Int. Cl.
*B01D 53/56* (2006.01)
*B01D 53/14* (2006.01)
(Continued)

(52) U.S. Cl.
CPC ..... *B01D 53/1468* (2013.01); *B01D 53/1493* (2013.01); *B01D 53/78* (2013.01); *B01D 53/8603* (2013.01); *B01D 53/8609* (2013.01); *C01B 17/0478* (2013.01); *C01B 17/16* (2013.01); *B01D 2251/11* (2013.01); *B01D 2251/208* (2013.01); *B01D 2252/20421* (2013.01); *B01D 2252/20431* (2013.01);
(Continued)

(58) Field of Classification Search
None
See application file for complete search history.

(56) References Cited

U.S. PATENT DOCUMENTS 5,716,587 A 2/1998 Khanmamedov
6,010,677 A * 1/2000 Scheybeler ......... C01B 17/0232
423/567.1

(Continued)

*Primary Examiner* — Anita Nassiri Motlagh
(74) *Attorney, Agent, or Firm* — Novick, Kim & Lee, PLLC; Allen Xue

(57) ABSTRACT

A method for treating sulfur-containing exhaust gases is provided, comprising the following steps: step i): mixing the sulfur-containing exhaust gases, air, and a hydrocarbon fuel, and controlling a reaction between the air and the hydrocarbon fuel therein, to obtain a procedure gas stream comprising the sulfur-containing exhaust gases, hydrogen, and carbon oxides; step ii): controlling a hydrogenation reaction between the hydrogen contained in the procedure gas stream and a sulfur-containing substance in the sulfur-containing exhaust gases, to obtain hydrogenated tail gases containing hydrogen sulfide; and step iii): absorbing the hydrogen sulfide contained in the hydrogenated tail gases with an absorbing agent to obtain purified tail gases.

16 Claims, 2 Drawing Sheets

(51) Int. Cl.
*B01D 53/78* (2006.01)
*B01D 53/86* (2006.01)
*C01B 17/16* (2006.01)
*C01B 17/04* (2006.01)

(52) U.S. Cl.
CPC .............. *B01D 2252/20489* (2013.01); *B01D 2257/302* (2013.01); *B01D 2257/308* (2013.01); *Y02P 20/124* (2015.11)

(56) References Cited

U.S. PATENT DOCUMENTS

| | | | | |
|---|---|---|---|---|
| 7,722,852 | B2* | 5/2010 | Rameshni | C01B 17/0404 423/573.1 |
| 2005/0063888 | A1 | 3/2005 | Chen | |
| 2008/0107581 | A1* | 5/2008 | Sparling | B01D 53/1462 423/222 |
| 2014/0079614 | A1* | 3/2014 | Liu | C01B 17/05 423/230 |

* cited by examiner

METHOD FOR TREATING SULPHUR-CONTAINING EXHAUST GASES AND DEVICE THEREOF

CROSS-REFERENCE TO RELATED APPLICATIONS

The present application claims benefit of Chinese patent application CN 201410248100.6, filed on Jun. 6, 2014, the entirety of which is incorporated herein by reference.

FIELD OF THE INVENTION

The present disclosure relates to the field of treatment of industrial exhaust gases, and specifically, to a method for treating sulfur-containing exhaust gases. More specifically, the present disclosure relates to a method for treating Claus tail gases exiting from a sulfur plant and exhaust gases generated during liquid sulfur degassing.

BACKGROUND OF THE INVENTION

As society develops, the problem of environmental pollution has become a factor restricting rapid economic growth. Therefore, environmental protection is essential for government legislation in countries around the world. Industrially developed countries have very strict requirements on sulfur emissions. The United States Environmental Protection Agency specifies through laws and regulations, an upper limit for the concentration of $SO_2$ as 50 ppm (v), equaling about 143 mg/m$^3$, in flue gases emitted from heating furnaces of the petroleum refining industry, in sulfur-containing tail gases, and in flue gases regenerated during catalytic cracking.

Currently, the Integrated Emission Standard of Air Pollutants (GB16297-1996) is being implemented in China for controlling the concentration of $SO_2$ in the flue gases emitted from a sulfur plant. This Standard prescribes that the concentration of $SO_2$ in emissions should be lower than 960 mg/m$^3$. In a new environmental protection standard to be implemented, it stipulates an upper limit for the concentration of $SO_2$ in the flue gases emitted from a sulfur plant as 400 mg/m$^3$, and a particular upper limit thereof as 200 mg/m$^3$. However, the concentration of $SO_2$ in the flue gases emitted from most sulfur plants is only below 960 mg/m$^3$ at present, with the standard requirement of 200 mg/m$^3$ hard to achieve.

Liquid sulfur degassing is an important measure for safe production in a sulfur recovery plant. The concentration of $H_2S$ in sulfur produced by a Claus process usually ranges from 300 to 500 ppm. Without liquid sulfur degassing, $H_2S_X$ dissolved in the liquid sulfur will decompose into $H_2S$, which will be released during storage, transportation, and processing steps of $H_2S_X$. When $H_2S$ accumulates to a certain concentration, such risks as toxicity and even explosion will be generated. In addition, solid sulfur molded from non-degasified sulfur will be subject to high fragility, and thus more sulfur granule and dust will be generated in loading, unloading, and transportation of the solid sulfur.

JACOBS employs Shell Group of Companies' patented technology of liquid sulfur degassing, wherein a stripping tower is provided in a liquid sulfur tank. Air is fed into the stripping tower, and under intense agitation of the air flow, $H_2S_X$ dissolved in the liquid sulfur decomposes into $H_2S$, which enters a gas phase space along with the air. The gas after being removed of $H_2S$ is pumped into a tail gas incinerator by a steam ejector. KTI uses BP Amoco's patented technology of liquid sulfur degassing. In this technology, a stripping tower in the form of a packed tower for catalytic reactions is arranged above a liquid sulfur tank. Liquid sulfur contained in the liquid sulfur tank, with the pressure thereof being elevated through a pump, enters the stripping tower from therebelow along with the air. After the liquid sulfur and the air pass through a packing layer of the packed tower, $H_2S_X$ dissolved therein decomposes into $H_2S$, which enters a gas phase space along with the air to form a gas mixture. Subsequently, the gas mixture is fed into an incinerator. A liquid sulfur degassing procedure developed by Siirtec Nigi (SINI) adopts a sieve-plate tower arranged above a liquid sulfur tank. The liquid sulfur contained in the liquid sulfur tank is elevated in pressure via a pump, and enters the stripping tower from therebelow together with air. The liquid sulfur and the air are in close contact with each other via sieve pores. $H_2S_X$ dissolved in the liquid sulfur decomposes into $H_2S$, which enters a gas phase space with the air. A resulting gas mixture is fed into an incinerator or a reaction furnace.

If exhaust gases generated during liquid sulfur degassing are fed to an incinerator and discharged after incineration therein, sulfur-containing substances such as hydrogen sulfide, sulfur vapor, and the like contained therein will be converted into $SO_2$ after combustion. As a result, the concentration of $SO_2$ in the flue gas emissions will be increased to range from 100 to 300 mg/m$^3$, which cannot satisfy the requirements of the new environment protection standard. On the other hand, if exhaust gasses generated during liquid sulfur degassing are fed to the reaction furnace for recycle of sulfur, the temperature in the furnace box of the reaction furnace will be reduced by about 30° C. Such a decrease of temperature in the furnace box has to be compensated for by an acid gas preheating measure, thus increasing energy consumption of the plant to a large extent, and sizes of the pipe and devices accordingly. In addition, a potential risk arises that the high concentration acid gas might return to the liquid sulfur tank.

SUMMARY OF THE INVENTION

The present disclosure aims to provide a method for treating exhaust gases generated during liquid sulfur degassing, comprising recovering sulfur and sulfur-containing compounds contained in the exhaust gases generated during liquid sulfur degassing, so as to reduce the concentration of $SO_2$ in the flue gas emitted from a sulfur plant, and solve the practical problem of substandard environment protection in existing sulfur recovery plants and those under construction. Thus, new environment protection standards to be implemented can be satisfied. This method requires small investments, low operating costs, and can protect environment and save energy.

A first solution of the present disclosure relates to a method for treating sulfur-containing exhaust gases, comprising the following steps:

step i): mixing the sulfur-containing exhaust gases, air, and a hydrocarbon fuel, and controlling a reaction between the air and the hydrocarbon fuel therein, to obtain a procedure gas stream containing the sulfur-containing exhaust gases, hydrogen, and carbon oxides, wherein the procedure gas stream is heated by heat released in the reaction between the air and the hydrocarbon fuel;

step ii): controlling a hydrogenation reaction between the hydrogen contained in the procedure gas stream and a sulfur-containing substance in the sulfur-containing exhaust gases, to obtain hydrogenated tail gases containing hydrogen sulfide; and step iii) absorbing the hydrogen sulfide contained in the hydrogenated tail gases with an absorbing agent to obtain purified tail gases.

In one preferred embodiment of the present disclosure, the method comprises further incinerating and then discharging the purified tail gases.

In one preferred embodiment of the present disclosure, in step i), the sulfur-containing exhaust gases, the air, and the hydrocarbon fuel are fed into an online heating furnace and mixed therein, after which the air and the hydrocarbon fuel are reacted and the procedure gas stream is heated.

In another preferred embodiment of the present disclosure, the hydrocarbon fuel is selected from methane-containing gasses, preferably as natural gas.

The online heating furnace uses mashgas or natural gas as a fuel. In a sulfur recovery plant having no external source of hydrogen supply, the fuel in the online heating furnace should be under a sub-equivalent amount combustion state through control. As such, while the sulfur-containing exhaust gases are reheated, hydrogen can be generated and then supplied as a hydrogen source to the hydrogenator for hydrogenation performed therein, wherein the main reactions include:

$$C_nH_m + O_2 \rightarrow CO + H_2 + Q \quad (1), \text{ and}$$

$$C_nH_m + O_2 \rightarrow CO_2 + H_2 + Q \quad (2).$$

In one preferred embodiment of the present disclosure, the sulfur-containing exhaust gases are mixed with the air before entering the online heating furnace. Specifically, the exhaust gases generated during liquid sulfur degassing are introduced into the online heating furnace in the form of air, thus reducing the amount of air supplied into the online heating furnace, wherein oxygen is consumed through reactions with the hydrocarbon fuel as indicated above in formulae (1) and (2).

In one preferred embodiment of the present disclosure, the sulfur-containing exhaust gases can be tail gases released from a tail gas purification unit of a sulfur recovery plant, and/or exhaust gases released from a sulfur plant during liquid sulfur degassing.

Specifically, the tail gases released from a tail gas purification unit of a sulfur recovery plant, i.e., Claus tail gases, are generated after acid gasses from a Claus process for reduction, absorption and recovery of sulfur pass through a reacting furnace, a primary-stage sulfur cooler, a primary-stage reactor, a secondary-stage sulfur cooler, a secondary-stage reactor, and a third-stage sulfur cooler. The Claus tail gases comprise 0-5% by volume of $H_2S$, 0-2% by volume of $SO_2$, 0-0.2% by volume of COS, and sulfur vapor, saturated water vapor, and nitrogen as balances, preferably 0-3% by volume of $H_2S$, 0-1% by volume of $SO_2$, 0-0.1% by volume of COS, and sulfur vapor, saturated water vapor, and nitrogen as balances.

Specifically, the exhaust gases generated during liquid sulfur degassing refer to sulfur-containing exhaust gases generated after a liquid sulfur degassing procedure is performed on liquid sulfur produced by a sulfur plant, through air bubble degassing or stripping tower degassing, wherein the liquid sulfur degassing procedure employs air as a gas source. The exhaust gasses generated during the liquid sulfur degassing comprise air, sulfur vapor, hydrogen sulfide, sulfur dioxide, organic sulfur, etc. The amount of exhaust gasses generated during liquid sulfur degassing ranges from 0.02 to 0.10 kg, preferably 0.04 to 0.06 kg per kilogram of liquid sulfur.

In a further preferred embodiment of the present disclosure, steam power is used for introducing the sulfur-containing exhaust gases into the online heating furnace. The pressure of the steam ranges from 0.03 to 0.1 MPa, preferably 0.5 to 0.1 MPa, and the amount of steam used ranges from 0.1 to 2 t/h, preferably 0.3 to 1.0 t/h.

In one preferred embodiment of the present disclosure, the procedure gas stream is heated to a temperature in the range from 200 to 300° C. via the online heating furnace.

In one preferred embodiment of the present disclosure, the hydrogenation reaction is performed in a hydrogenation reactor, wherein the sulfur-containing substance contained in the procedure gas stream is converted into hydrogen sulfide under the function of a hydrogenation catalyst. In a further preferred embodiment, the procedure gas stream that enters the hydrogenation reactor comprises 0-3% by volume of $H_2S$, 0-1% by volume of $SO_2$, 0-0.1% by volume of COS, and sulfur vapor, water vapor, and nitrogen as balances.

According to the present disclosure, the hydrogenation catalyst used in the hydrogenation reaction should have superior hydrogenation and hydrolysis activities at low temperatures, and high hydrothermal stability, because the exhaust gases generated during liquid sulfur degassing contain a high content of water vapor therein, and sulfur vapor should be hydrogenated within two seconds to prevent occurrence of the phenomenon of sulfur penetration. High activity catalyst LSH-03 which is developed by Research Institute of Qilu Branch Co., SINOPEC, and disclosed in CN 201010269123.7, the entirety of which is incorporated herein by reference, can be preferably used.

Sulfur-containing compounds contained in the procedure gas stream are converted into hydrogen sulfide through hydrogenation or hydrolysis in the hydrogenation reactor under the function of the hydrogenation catalyst, wherein the following hydrogenation reactions mainly occur:

$$SO_2 + H_2 \rightarrow H_2O + H_2S \quad (3),$$

$$S + H_2 \rightarrow H_2S \quad (4),$$

$$CS_2 + H_2O \rightarrow H_2S + CO_2 \quad (5), \text{ and}$$

$$COS + H_2O \rightarrow H_2S + CO_2 \quad (6).$$

In some other preferred embodiments of the present disclosure, the absorbing agent is an ammine-containing liquid, preferably N-methyldiethanolamine (MDEA).

In one preferred embodiment of the present disclosure, in step iii), the hydrogenated tail gases containing hydrogen sulfide are quenched in a quench tower to a temperature in the range from 25 to 42° C., preferably 30 to 38° C., and then enter an absorbing tower filled with the absorbing agent, wherein the hydrogen sulfide is absorbed by the absorbing agent, to generate the purified tail gases. After the above absorption, the content of hydrogen sulfide contained in the purified tail gases will be reduced to a level lower than 100 ppm (v). The purified gases will then be introduced into the incinerator for incineration to reach the emission standard, before being discharged therefrom.

In a further preferred embodiment, an absorbing liquid absorbed with hydrogen sulfide is fed into an absorbent regeneration tower for regeneration, to produce a regenerated acid gas, which will be fed back into step i), and a regenerated amine liquid, which will be returned to step iii) for use.

A second solution of the present disclosure relates to a device for treating sulfur-containing exhaust gases, comprising:

an online heating furnace, used for mixing the sulfur-containing exhaust gases, air, and a hydrocarbon fuel, and controlling a reaction between the air and the hydrocarbon fuel therein, to obtain a procedure gas stream containing exhaust gases generated during liquid sulfur degassing, hydrogen, and carbon oxides, wherein the procedure gas stream is heated by heat released in the reaction between the air and the hydrocarbon fuel;

a hydrogenator in communication with the online heating furnace, used for receiving the procedure gas stream from the online heating furnace, and controlling a hydrogenation reaction between the hydrogen contained in the procedure gas stream and a sulfur-containing substance contained in the sulfur-containing exhaust gases generated during liquid sulfur degassing in the presence of a hydrogenation catalyst, to obtain hydrogenated tail gases containing hydrogen sulfide; and an absorbing tower in communication with the hydrogenator, used for receiving the hydrogenated tail gases containing hydrogen sulfide exiting from the hydrogenator, wherein the hydrogen sulfide contained in the hydrogenated tail gases is absorbed by an absorbing agent filled in the absorbing tower, to generate purified tail gases and an absorbing liquid absorbed with hydrogen sulfide.

In one preferred embodiment of the present disclosure, the device further comprises an incinerator in communication with the absorbing tower, used for receiving and incinerating the purified tail gases coming from the absorbing tower, and discharging incinerated tail gases.

In one preferred embodiment of the present disclosure, the device further comprises a quench tower in communication with the hydrogenator and the absorbing tower, the quench tower being used for cooling down the hydrogenated tail gases to a temperature in the range from 25 to 42° C., preferably 30 to 38° C. before the hydrogenated tail gases enter the absorbing tower.

In one preferred embodiment of the present disclosure, the device further comprises a regeneration tower in communication with the absorbing tower and the online heating furnace, respectively, the regeneration tower being used for regenerating the absorbing agent coming from the absorbing tower and absorbed with hydrogen sulfide, to produce a regenerated absorbing agent and a regenerated gas, wherein the regenerated absorbing agent is returned to the absorbing tower, while the regenerated gas is returned to the online heating furnace for further treatment.

As a specific, complete technical solution, the method of the present disclosure can comprise the following steps:

step i): mixing Claus tail gases exiting from a tail gas purification unit of a sulfur recovery plant and/or exhaust gases released from a sulfur plant during liquid sulfur degassing, air, and a hydrocarbon fuel in an online heating furnace, and controlling a reaction between the air and the hydrocarbon fuel therein, to obtain a procedure gas stream containing the Claus tail gases exiting from a tail gas purification unit of a sulfur recovery plant and/or the exhaust gases released from the sulfur plant during liquid sulfur degassing, hydrogen, and carbon oxides, wherein the procedure gas stream is heated by heat released in the reaction between the air and the hydrocarbon fuel;

step ii): feeding the procedure gas stream into a hydrogenator, and controlling a hydrogenation reaction between the hydrogen contained in the procedure gas stream and a sulfur-containing substance in the sulfur-containing exhaust gases generated during liquid sulfur degassing, in the presence of a hydrogenation catalyst, to obtain hydrogenated tail gases containing hydrogen sulfide; and step iii): feeding the hydrogenated tail gases into a quench tower to quench them to a temperature in the range from 25 to 42° C., preferably 30 to 38° C., feeding the quenched hydrogenated tail gases into an absorbing tower filled with N-methyldiethanolamine (MDEA), and absorbing the hydrogen sulfide contained in the hydrogenated tail gases to obtain purified tail gases and an amine-containing solution rich in hydrogen sulfide, wherein the purified tail gases are discharged after being incinerated in an incinerator, while the amine-containing solution rich in hydrogen sulfide is fed into a regenerating tower for regeneration, to obtain a hydrogen sulfide-containing regeneration gas, which will be returned to the online heating furnace for further recovery of the element of sulfur, and a regenerated amine-containing solution, which will be returned to the absorbing tower for use.

Compared with the prior art, the present disclosure has the following beneficial effects.

At the outset, the present disclosure provides a relatively economic method for reducing the concentration of $SO_2$ in the emissions from a sulfur recovery plant. Compared with direct incineration of exhaust gases generated during liquid sulfur degassing in an incinerator, the method of the present disclosure can reduce the concentration of $SO_2$ in the emissions from a sulfur plant to a range from 100 to 300 mg/m$^3$. As a result, the practical problem of substandard emissions from existing sulfur plants and those under construction can be removed, and the new environment protection standard to be implemented can be satisfied.

Besides, exhaust gasses generated during liquid sulfur degassing can partially replace air to be fed into the online heating furnace. This can reduce the amount of air used, thereby reducing both flow of the procedure gas stream in the sulfur plant, and sizes of pipes and devices.

Moreover, exhaust gasses generated during liquid sulfur degassing can partially replace air to be fed into the online heating furnace, thus facilitating combustion at a sub-equivalent amount of oxygen. Oxygen is consumed through incineration in the online heating furnace. This reduces the amount of hydrogen used in the hydrogenator, and meanwhile prevents the activity of the hydrogenation catalyst from being influenced by excessive oxygen. As a result, the service life of the catalyst can be prolonged thereby.

In addition, the method according to the present disclosure constitutes a supplement to a tail gas treatment process (such as a Claus process) which is in conformity with an existing standard, i.e., a concentration of $SO_2$ in emissions less than 960 mg/m$^3$. Therefore, the existing process only needs to be improved by incorporating a treatment step thereto, instead of being entirely replaced. Such a treatment step is rather simple and easy to achieve. Hence, the new standard, i.e., the concentration of $SO_2$ in emissions less than 200 mg/m$^3$, can be achieved at a low cost.

Figure 1:
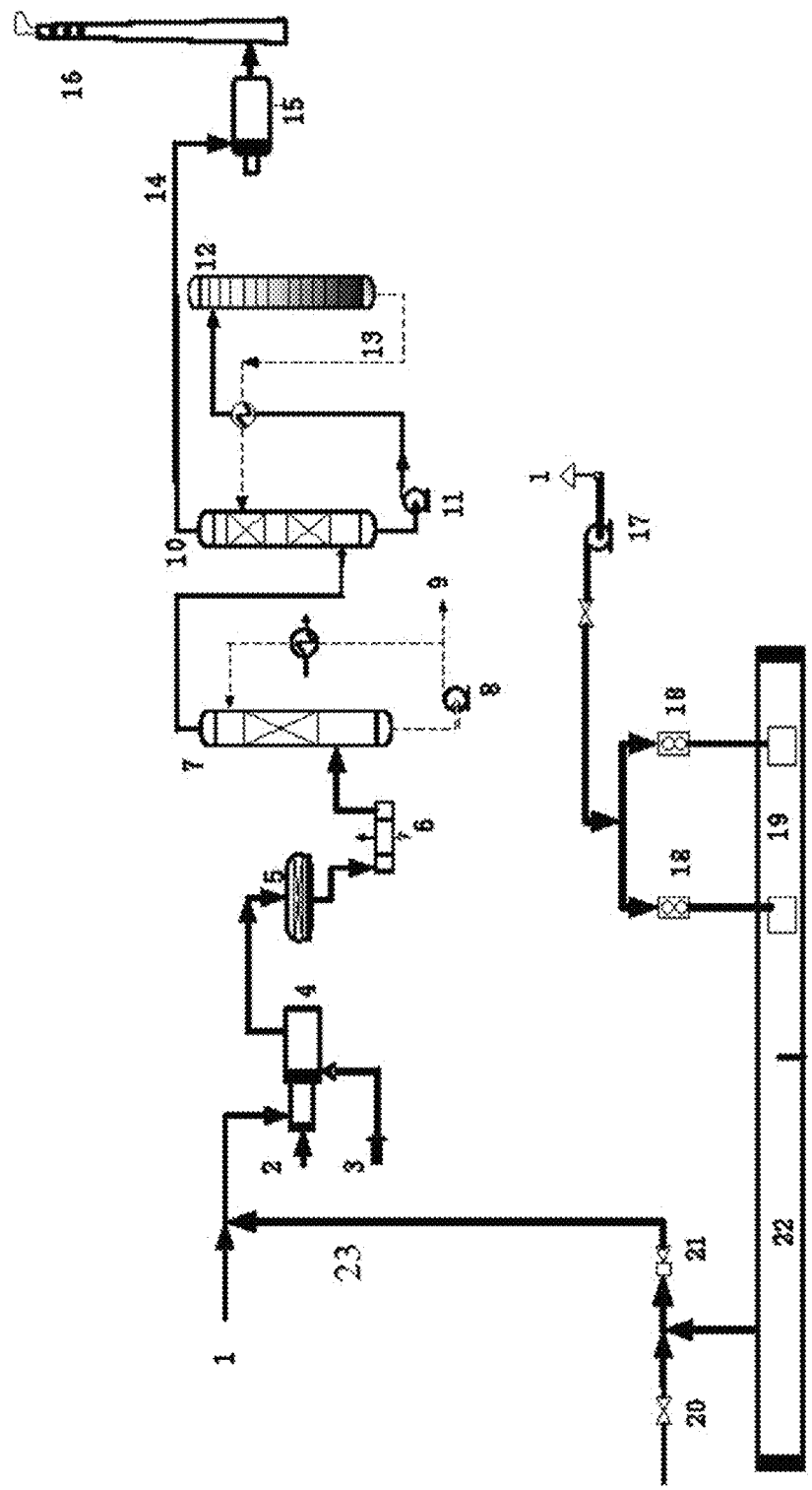
FIG. 1 shows a flow chart according to an embodiment of the present disclosure.

In the present disclosure, the same materials, units, or components are indicated by the same reference signs.

DETAILED DESCRIPTION OF THE EMBODIMENTS

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, group of elements, components, and/or groups thereof.

Language such as "including," "comprising," "having," "containing," or "involving," and variations thereof, is intended to be broad and encompass the subject matter listed thereafter, as well as equivalents, and additional subject matter not recited. Further, whenever a composition, a group of elements, process or method steps, or any other expression is preceded by the transitional phrase "comprising," "including," or "containing," it is understood that it is also contemplated herein the same composition, group of elements, process or method steps or any other expression with transitional phrases "consisting essentially of," "consisting of," or "selected from the group of consisting of," preceding the recitation of the composition, the group of elements, process or method steps or any other expression.

The corresponding structures, materials, acts, and equivalents of all means or step plus function elements in the claims, if applicable, are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiments described herein were chosen and described in order to best explain the principles of the present disclosure and the practical application, and to enable others of ordinary skill in the art to understand the present disclosure for various embodiments with various modifications as are suited to the particular use contemplated. Accordingly, while the present disclosure has been described in terms of embodiments, those of skill in the art will recognize that the present disclosure can be practiced with modifications and in the spirit and scope of the appended claims.

Reference will now be made in detail to certain disclosed subject matter. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which can be included within the scope of the presently disclosed subject matter as defined by the claims.

Sulfur-Containing Exhaust Gases

The method of the present disclosure can be used for treating any sulfur-containing exhaust gases, and particularly suitable for treating Claus tail gases released from a tail gas purification unit of a sulfur recovery plant, and/or exhaust gases released from a sulfur plant during liquid sulfur degassing.

Specifically, the tail gases released from a tail gas purification unit of a sulfur recovery plant, i.e., Claus tail gases, are generated after acid gasses from a Claus process for reduction, absorption and recovery of sulfur pass through a reacting furnace, a primary-stage sulfur cooler, a primary-stage reactor, a secondary-stage sulfur cooler, a secondary-stage reactor, and a third-stage sulfur cooler. The Claus tail gases comprise 0-5% by volume of $H_2S$, 0-2% by volume of $SO_2$, 0-0.2% by volume of COS, and sulfur vapor, saturated water vapor, and nitrogen as balances, preferably 0-3% by volume of $H_2S$, 0-1% by volume of $SO_2$, 0-0.1% by volume of COS, and sulfur vapor, saturated water vapor, and nitrogen as balances.

Specifically, the exhaust gases generated during liquid sulfur degassing refer to sulfur-containing exhaust gases generated after a liquid sulfur degassing procedure is performed on liquid sulfur produced by a sulfur plant, through air bubble degassing or stripping tower degassing, wherein the liquid sulfur degassing procedure employs air as a gas source. The exhaust gasses generated during the liquid sulfur degassing comprise air, sulfur vapor, hydrogen sulfide, sulfur dioxide, organic sulfur, etc. In the present disclosure, steam power is preferably used for introducing the exhaust gases generated during liquid sulfur degassing into the online heating furnace, wherein the pressure of the steam ranges from 0.03 to 0.1 MPa, preferably 0.05 to 0.1 MPa, and the amount of steam used ranges from 0.1 to 2 t/h, preferably 0.3 to 1.0 t/h.

The exhaust gases generated during liquid sulfur degassing are mixed with air in the online heating furnace before hydrogenation. That is, the exhaust gases generated during liquid sulfur degassing are introduced into the online heating furnace in the form of air. As a result, the amount of air supplied into the online heating furnace can be reduced, wherein oxygen is consumed through reactions with the hydrocarbon fuel as indicated above in formulae (1) and (2).

Online Heating Furnace

The online heating furnace of the present disclosure can be any online heating furnace used in the art.

Hydrogenator

The hydrogenator of the present disclosure can be any hydrogenator used in the art.

Hydrogenation Catalyst

The hydrogenation catalyst used in the present disclosure refers to high activity catalyst LSH-03, which is developed by Research Institute of Qilu Branch Co., SINOPEC, and disclosed in CN 201010269123.7, the entirety of which is incorporated herein by reference.

Example 1

The procedure is shown in FIG. 1. In this example, the sulfur-containing exhaust gases included Claus tail gases 3 released from a tail gas purification unit of a sulfur recovery plant, and exhaust gases 23 generated during liquid sulfur degassing. The procedure of this example specifically included the following steps.

In step i) of this procedure, Claus tail gases 3 released from a tail gas purification unit of a sulfur recovery plant and exhaust gasses 23 generated during liquid sulfur degassing were both fed into an online heating furnace 4. The liquid sulfur degassing was performed through air bubble degassing or stripping tower degassing, and a steam 20 was used for feeding the exhaust gasses 23 generated during liquid sulfur degassing into the online heating furnace 4. Sulfur-containing exhaust gases, including the Claus tail gases 3 released from the tail gas purification unit and the exhaust gasses 23 generated during liquid sulfur degassing, were mixed with an air 1 and a hydrocarbon fuel 2 in the online heating furnace 4, wherein the air 1 and the hydrocarbon fuel 2 reacted with each other to generate carbon oxides and hydrogen. As such, a procedure gas stream comprising sulfur-containing exhaust gases, hydrogen, and carbon oxides were obtained, and was heated to a temperature in the range from 200 to 300° C. in the online heating furnace 4.

In step ii), the procedure gas stream was fed into a hydrogenator 5, wherein sulfur-containing compounds were converted into hydrogen sulfide under the function of a hydrogenation catalyst. Thus, hydrogenated tail gases containing hydrogen sulfide were obtained.

In step iii), the hydrogenated tail gases containing hydrogen sulfide were quenched to 38° C. in a quench tower 7, and then entered an absorbing tower 10. Absorbing agent N-methyldiethanolamine filled in the absorbing tower absorbed hydrogen sulfide contained in the hydrogenated tail gases, to generate purified tail gases 14 and an absorbing agent 11 absorbed with hydrogen sulfide. The purified tail gases 14 were introduced into an incinerator 15 and incinerated therein, before being discharged therefrom, while the absorbing agent 11 absorbed with hydrogen sulfide entered a regeneration tower for regeneration. A regenerated absorbing agent 13 was obtained and returned to the absorbing tower 10, while a regenerated acid gas entered the sulfur recovery procedure.

The Claus tail gases 3 released from the tail gas purification unit of the sulfur recovery plant comprised 2% by volume of $H_2S$, 1% by volume of $SO_2$, 0.05% by volume of COS, and sulfur vapor, saturated water vapor, and nitrogen as balances.

The liquid sulfur degassing was performed through air bubble degassing or stripping tower degassing, at a flow of 0.05 kg of air per kg of liquid sulfur. The steam 20 was used for introducing exhaust gases generated during liquid sulfur degassing into the online heating furnace 4, wherein the steam was at a pressure of 0.1 MPa and a flow of 0.5 t/h.

High activity catalyst LSH-03 developed by Research Institute of Qilu Branch Co., SINOPEC was used in this example.

The concentrations of $SO_2$ in the flue gases emitted from the sulfur plant of this example were listed in Table 1.

Example 2

The procedure steps of Example 1 were used in this example, and the Claus tail gases 3 from the tail gas purification unit of the sulfur recovery plant comprised 1% by volume of $H_2S$, 0.5% by volume of $SO_2$, 0.02% by volume of COS, and sulfur vapor, saturated water vapor, and nitrogen as balances.

The liquid sulfur degassing was performed through air bubble degassing or stripping tower degassing, at a flow of 0.06 kg of air per kg of liquid sulfur. The steam 20 at a pressure of 0.3 MPa and a flow of 0.5 t/h was used for introducing exhaust gases generated during liquid sulfur degassing into the online heating furnace 4.

The concentrations of $SO_2$ in the flue gases emitted from the sulfur plant of this example were listed in Table 1.

Example 3

The procedure steps of Example 1 were used, and the Claus tail gases 3 released from the tail gas purification unit of the sulfur recovery plant comprised 2% by volume of $H_2S$, 1.0% by volume of $SO_2$, 0.05% by volume of COS, and sulfur vapor, saturated water vapor, and nitrogen as balances.

The liquid sulfur degassing was performed through air bubble degassing or stripping tower degassing, at a flow of 0.1 kg of the air 1 per kg of liquid sulfur. The steam 20 at a pressure of 0.3 MPa and a flow of 1.0 t/h was used for introducing the exhaust gases generated during liquid sulfur degassing into the online heating furnace 4.

The hydrogenated tail gases containing hydrogen sulfide were quenched to 40° C. in the quench tower 7.

The concentrations of $SO_2$ in the flue gases emitted from the sulfur plant of this example were listed in Table 1.

Example 4

Figure 2:
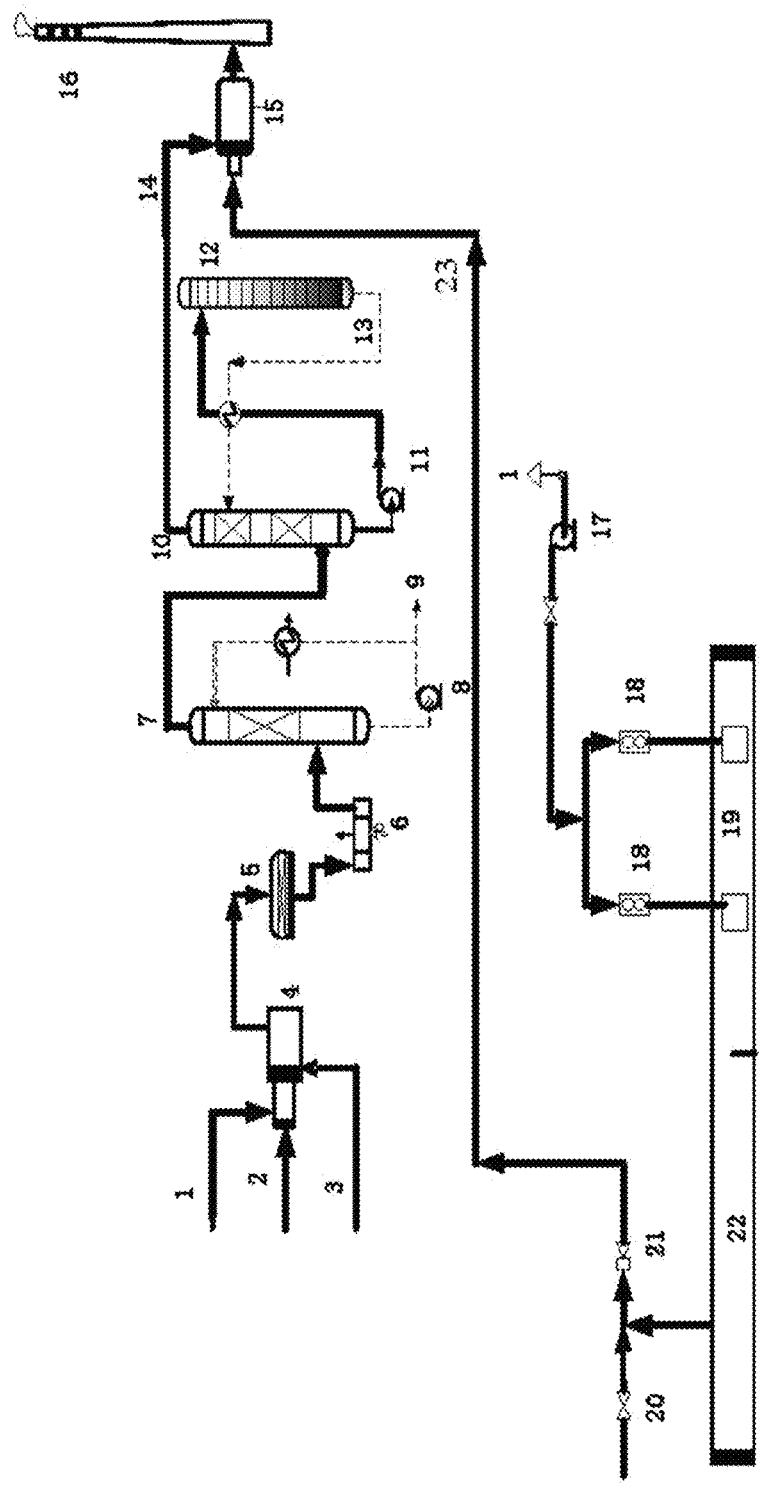
FIG. 2 shows a flow chart according to another embodiment of the present disclosure.

According to the procedure steps as shown in FIG. 2, exhaust gases generated during sulfur degassing were directly introduced into the incinerator 15 for incineration. The tail gases released from the sulfur recovery plant were treated in the same way as explained in Example 1.

The Claus tail gases 3 released from the tail gas purification unit of the sulfur recovery plant comprised 2% by volume of $H_2S$, 1.0% by volume of $SO_2$, 0.05% by volume of COS, and sulfur vapor, saturated water vapor, and nitrogen as balances.

The liquid sulfur degassing was performed through air bubble degassing or stripping tower degassing, at a flow of 0.1 kg of the air 1 per kg of liquid sulfur.

The steam 20 at a pressure of 0.3 MPa and a flow of 1.0 t/h was used for introducing the exhaust gases generated during liquid sulfur degassing into the online heating furnace 4.

The Claus tail gases 3, after being heated to a temperature in the range from 200 to 300° C. in the online heating furnace 4, entered the hydrogenator 5, wherein sulfur-containing compounds were converted into hydrogen sulfide under the function of a hydrogenation catalyst. The hydrogenated tail gases containing hydrogen sulfide were quenched to 40° C. in the quench tower 7, and then entered the absorbing tower 10 filled with amine liquor, wherein the amine liquor absorbed hydrogen sulfide contained in the hydrogenated tail gases, to generate purified tail gases 14. Afterwards, the purified tail gases 14 were mixed with the exhaust gases generated during liquid sulfur degassing. The resulting mixture thereof was introduced into the incinerator 15 and discharged therefrom after incineration.

The concentrations of $SO_2$ in the flue gases emitted from the sulfur plant of this example were listed in Table 1.

The amine liquor absorbed with hydrogen sulfide (rich amine solution) entered the regeneration tower 12, to produce a regenerated acid gas, which was mixed with acid gases in the reaction furnace, and returned to a thermal reaction section for further recovery of the element of sulfur.

The exhaust gasses generated during liquid sulfur degassing, comprising air, sulfur vapor, hydrogen sulfide, organic sulfur, and the like, were heated to a temperature in the range from 500 to 800° C. in the incinerator, wherein the sulfur vapor, the hydrogen sulfide, the organic sulfur, and the like were converted into $SO_2$.

In table 1, numbers 1-9 indicate nine experiments performed in similar manners with nine samples.

TABLE 1

Concentrations of SO$_2$ in the flue gases emitted from the sulfur plant (mg/m$^3$)

| Number of sample | Example 1 | Example 2 | Example 3 | Example 4 |
|---|---|---|---|---|
| 1 | 202 | 180 | 280 | 450 |
| 2 | 186 | 220 | 265 | 389 |
| 3 | 150 | 260 | 270 | 420 |
| 4 | 201 | 201 | 220 | 386 |
| 5 | 220 | 198 | 230 | 398 |
| 6 | 230 | 169 | 198 | 400 |
| 7 | 280 | 256 | 200 | 450 |
| 8 | 286 | 232 | 210 | 520 |
| 9 | 270 | 200 | 256 | 480 |

Table 1 indicates that the concentration of SO$_2$ in the flue gases emitted from the sulfur plant of the present disclosure (Examples 1, 2, and 3) is lower than 300 mg/m$^3$, which is 100-300 mg/m$^3$ lower than the concentration of SO$_2$ in the flue gases generated in the procedure steps of Example 4. As can be concluded, the present disclosure excels in treating exhaust gases generated during liquid sulfur degassing, and the requirements of the environment protection laws and regulations to be implemented can be satisfied though the method of the present disclosure.

Comparative Example 1

The procedure steps of Example 4 were used. The hydrogenator 5 was filled with ordinary hydrogenation catalyst LS-951, which was developed by Research Institute of Qilu Branch Co., SINOPEC, and disclosed in CN 200310105748.X, the entirety of which is incorporated herein by reference, for hydrogenation of Claus tail gases 3. The exhaust gases generated during liquid sulfur degassing were heated to a required temperature in a heater. The test results of Example 1 and Comparative Example 1 using different hydrogenation catalysts and different procedure steps were shown in Table 2.

TABLE 2

Test results of different hydrogenation catalysts

| Inlet temperature (° C.) | | Example 1 | Comparative Example 1 |
|---|---|---|---|
| 220 | Conversion of hydrogenation, % | 100 | 70 |
| | Conversion of hydrolysis, % | 100 | 51 |
| | Phenomenon | The sulfur plant worked properly. | Sulfur accumulated in the quench tower. |
| 240 | Conversion of hydrogenation, % | 100 | 95 |
| | Conversion of hydrolysis, % | 100 | 80 |
| | Phenomenon | The sulfur plant worked properly. | Sulfur accumulated in the quench tower. |
| 260 | Conversion of hydrogenation, % | 100 | 100 |
| | Conversion of hydrolysis, % | 100 | 95 |
| | Phenomenon | The sulfur plant worked properly. | Sulfur accumulated in the quench tower. |
| 280 | Conversion of hydrogenation, % | 100 | 100 |
| | Conversion of hydrolysis, % | 100 | 100 |
| | Phenomenon | The sulfur plant worked properly. | The sulfur plant worked properly. |

The results in Table 2 show that, high activity catalyst LSH-03 developed by Research Institute of Qilu Branch Co., SINOPEC, was used in the hydrogenator reactor 5 in Example 1, such that the inlet temperature of the hydrogenator 5 was lowered down to 220° C., and the sulfur plant worked properly. The exhaust gases generated during liquid sulfur degassing could be directly mixed with the Claus tail gases 3 without having to be heated. In Comparative Example 1, traditional hydrogenation catalyst LS-951 developed by Research Institute of Qilu Branch Co., SINOPEC was used for hydrogenation of Claus tail gases 3. This rendered it necessary to use a gas heater to heat the exhaust gases generated during liquid sulfur degassing to about 280° C., so as to ensure a 100% of hydrogenation conversion and a 100% of hydrolysis conversion. A temperature lower than 260° C. cannot satisfy the requirements for the hydrogenation conversion or the hydrolysis conversion. In addition, the quench tower 7 would be frequently blocked, which is a suggestion of incomplete hydrogenation of sulfur vapor carried in the exhaust gases generated during liquid sulfur degassing, and occurrence of the phenomenon of sulfur penetration. Therefore, high activity catalyst LSH-03 can be used to bring about better effects.

As will be appreciated by one skilled in the art, the foregoing functions and/or process may be embodied as a system, method or computer program product. For example, the functions and/or process may be implemented as computer-executable program instructions recorded in a computer-readable storage device that, when retrieved and executed by a computer processor, controls the computing system to perform the functions and/or process of embodiments described herein. In one embodiment, the computer system can include one or more central processing units, computer memories (e.g., read-only memory, random access memory), and data storage devices (e.g., a hard disk drive). The computer-executable instructions can be encoded using any suitable computer programming language (e.g., C++, JAVA, etc.). Accordingly, aspects of the present disclosure may take the form of an entirely software embodiment (including firmware, resident software, micro-code, etc.) or an embodiment combining software and hardware aspects.

From the above description, it is clear that the present disclosure is well adapted to carry out the objects and to attain the advantages mentioned herein as well as those inherent in the presently provided disclosure. While preferred embodiments have been described for purposes of this disclosure, it will be understood that changes may be made which will readily suggest themselves to those skilled in the art and which are accomplished within the spirit of the present disclosure.

LIST OF REFERENCE NUMBERS

1. air;
2. hydrocarbon fuel;
3. Claus tail gases;
4. online heating furnace;
5. hydrogenator;
6. steam generator;
7. quench tower;
8. circulating pump;
9. sewage;
10. absorbing tower;
11. absorbing agent absorbed with hydrogen sulfide;
12. regeneration tower;
13. regenerated absorbing agent;
14. purified tail gases;

15. incinerator;
16. chimney;
17. air blower;
18. flowmeter;
19. degassing tank;
20. steam;
21. stream ejector;
22. liquid sulfur tank; and
23. exhaust gases generated during liquid sulfur degassing.

The invention claimed is:

1. A method for treating a sulfur-containing exhaust gas, comprising the following steps:
   step i): introducing a mixture of steam, the sulfur-containing gas, air, and a hydrocarbon fuel into an online heating furnace, and controlling a reaction between air and the hydrocarbon fuel therein to obtain a procedure gas stream containing a sulfur-containing substance, hydrogen, and carbon oxides, wherein the procedure gas stream is heated by heat released in a reaction between air and the hydrocarbon fuel, wherein the sulfur-containing exhaust gas is a Claus tail gas released from a tail gas purification unit, an exhaust gas from degassing of a liquid sulfur by bubbling air through the liquid sulfur, or a mixture thereof;
   step ii): controlling a hydrogenation reaction between hydrogen contained in the procedure gas stream and the sulfur-containing substance to obtain a hydrogenated tail gas containing hydrogen sulfide; and
   step iii) absorbing hydrogen sulfide contained in the hydrogenated tail gases with an absorbing agent to obtain a purified tail gas and an absorbing agent rich in hydrogen sulfide.

2. The method according to claim 1, further comprising incinerating and then discharging the purified tail pas.

3. The method according to claim 1, wherein the hydrocarbon fuel is a methane-containing gas.

4. The method according to claim 1, wherein the sulfur-containing exhaust gas is mixed with air before entering the online heating furnace.

5. The method according to claim 1, wherein a pressure of the steam ranges from 0.03 to 0.1 MPa, the steam is mixed with the sulfur-containing gas, and the mixture of the steam and the sulfur-containing gas passes through a steam ejector.

6. The method according to claim 1, wherein the procedure gas stream is heated to a temperature ranging from 200 to 300° C.

7. The method according to claim 1, wherein the sulfur-containing substance in the procedure gas stream is converted into hydrogen sulfide in a hydrogenator under the function of a hydrogenation catalyst.

8. The method according to claim 1, wherein the absorbing agent is a desulphurizer.

9. The method according to claim 1, wherein in step iii), the hydrogenated tail gas containing hydrogen sulfide is quenched in a quench tower to a temperature ranging from 25 to 42° C., before entering an absorbing tower filled with the absorbing agent, wherein the hydrogen sulfide is absorbed by the absorbing agent.

10. The method according to claim 1, wherein the absorbing agent rich in hydrogen sulfide is fed into an absorbent regeneration tower for regeneration, producing an acid gas and a regenerated absorbing agent, wherein the acid gas is fed into the online heating furnace and the regenerated absorbing agent is recycled to the absorbing tower.

11. The method according to claim 3, wherein the hydrocarbon fuel is natural gas.

12. The method according to claim 8, wherein the absorbing agent is an amine-containing liquid.

13. The method according to claim 8, wherein the absorbing agent is N-methyldiethanolamine.

14. The method according to claim 7, wherein the hydrogenation catalyst is catalyst LSH-03.

15. The method according to claim 2, wherein the pressure of steam ranges from or 0.5 to 0.1 MPa.

16. The method according to claim 9, wherein in step iii), the hydrogenated tail gas containing hydrogen sulfide is quenched in a quench tower to a temperature ranging from 30 to 38° C.

* * * * *